(12) United States Patent
Chaudeurge

(10) Patent No.: US 8,678,404 B2
(45) Date of Patent: Mar. 25, 2014

(54) STROLLER CHASSIS, IN PARTICULAR FOR TRANSPORTING A CHILD

(75) Inventor: Jean-Michel François Chaudeurge, Tourves (FR)

(73) Assignee: Astrollab (FR)

( * ) Notice: Subject to any disclaimer, the term of this patent is extended or adjusted under 35 U.S.C. 154(b) by 0 days.

(21) Appl. No.: 13/580,369

(22) PCT Filed: Feb. 22, 2011

(86) PCT No.: PCT/FR2011/050365
§ 371 (c)(1),
(2), (4) Date: Dec. 10, 2012

(87) PCT Pub. No.: WO2011/104474
PCT Pub. Date: Sep. 1, 2011

(65) Prior Publication Data
US 2013/0069329 A1     Mar. 21, 2013

(30) Foreign Application Priority Data
Feb. 23, 2010  (FR) .................................... 10 51280

(51) Int. Cl.
*A01B 73/06* (2006.01)
(52) U.S. Cl.
USPC .............................................. 280/86; 16/45
(58) Field of Classification Search
USPC .................... 280/86, 86.1, 124.116, 124.125, 280/124.128; 16/33, 44, 45
See application file for complete search history.

(56) References Cited

U.S. PATENT DOCUMENTS

| 2,799,514 | A | 7/1957 | Kramcsak, Jr. |
| 7,383,611 | B2 * | 6/2008 | Foster ............................... 16/20 |
| 7,832,745 | B2 * | 11/2010 | Rauch, Jr. ........................ 280/86 |
| 8,256,786 | B2 * | 9/2012 | Ludovici et al. ........... 280/250.1 |

FOREIGN PATENT DOCUMENTS

| EP | 2138375 A1 | 12/2009 |
| GB | 2240266 A | 7/1991 |
| WO | 97/24235 A1 | 7/1997 |

OTHER PUBLICATIONS

International Search Report for corresponding International Application No. PCT/FR2011/050365.

* cited by examiner

*Primary Examiner* — Faye M. Fleming
(74) *Attorney, Agent, or Firm* — Knobbe Martens Olson and Bear, LLP

(57) ABSTRACT

A stroller chassis includes a frame and a wheel that are connected to each other by a hinge defining a pivoting axis extending perpendicularly to the wheel's axis. The chassis can also include a bearing for guiding the frame and the wheel in free rotation about the axis. The chassis can include two plates, each including an annular body substantially centered with respect to the pivoting axis and arranged externally around the bearing. The two annular bodies are connected rotatably about the pivoting axis to the frame and the wheel and define substantially planar surfaces on the plate surfaces, the planar surfaces being mutually adjoining along a plane that is transverse to the pivoting axis. The plates cooperate with one another through sliding and frictional contact. The Chassis can also include resilient member for pressing the annular bodies against each other to maintain contact between the planar surfaces.

15 Claims, 3 Drawing Sheets

STROLLER CHASSIS, IN PARTICULAR FOR TRANSPORTING A CHILD

CROSS-REFERENCE TO RELATED APPLICATIONS

This application is the U.S. National Phase under 35. U.S.C. §371 of International Application PCT/FR2011/050365, filed Feb. 22, 2011, which claims priority to French Patent Application No. 10 51280, filed Feb. 23, 2010. The International Application was published under PCT Article 21(2) in a language other than English.

The present invention relates to a stroller chassis. It particularly relates to the field of strollers for transporting young children.

To push a stroller on the ground, its chassis is typically equipped with wheels or casters. The invention more particularly relates to stroller chassises whereof at least some of the wheels, typically the front wheel(s), have a rolling axis on the ground, the position of which is not frozen relative to the frame of the chassis, but which, on the contrary, is pivotably provided around a substantially vertical axis. In other words, the or each of these wheels is mounted on the frame of the chassis so that it can be freely oriented, via an ad hoc mechanical hinge assembly. The pivot capacity of this or these wheels increases the maneuverability of the chassis on the ground, in particular to turn or turn around. One example is provided in document WO-A-2009/092970.

However, such a pivot capacity should be prohibited in certain circumstances: when the chassis is pushed on uneven or rocky terrain, it is preferable to freeze the orientation of all of the wheels such that the rolling axis is kept perpendicular to the direction of forward motion of the chassis, failing which, vibrations or even shocks are transmitted to the frame of the stroller. Likewise, in the case of stroller chassises with retractable wheels, it is generally advisable to neutralize the pivoting of the wheels relative to the frame of the chassis before retracting them.

In practice, the pivoting of the wheels is generally neutralized by mechanically blocking the hinging mechanism between the wheels and the frame of the chassis: to that end, the user must manually act on one or more dedicated control members. EP-A-2 138 375, on which the preamble of claim 1 is based, provides an example of this type of dedicated control member. In practice, the actuation of these members is tedious and the source of errors, or even insecurity. Furthermore, when the aforementioned hinge mechanism is neutralized, it absorbs stresses that are often substantial, causing risks of malfunction, in particular binding, preventing the pivoting of the wheels from being reestablished.

Furthermore, even under rolling conditions that appear favorable to the free pivoting of the wheels in relation to the frame of the chassis, it is not out of the question for pendular stresses, sources of vibrations and wear, to be regularly applied to the hinge mechanism between the orientable wheels and the frame, for example when the chassis is pushed in a tight turn or when the wheels are abruptly reapplied against the ground after having been temporarily taken off the ground, in particular to cross the sidewalk. Reference is then typically made to a guidage effect between the wheel and the frame.

Anti-guidage systems have been proposed in fields other than that of stroller chassises. In particular, WO-A-97/24235 proposes braking the free rotational movements of a ball bearing, inserted between a frame and one of its pivoting wheels, on the one hand by a series of first plates, which are rotatably connected, around the pivoting axis of the wheel, to a fork of that wheel, and on the other hand, a series of second plates that are rotatably connected, around the pivoting axis, to a shaft secured to the frame. The first and second plates are all arranged axially overhanging the ball bearing, while being alongside one another in an alternating manner, while soaking in a lubricant: the lubrication interfaces, thus obtained between each of the pairs of first and second adjoining plates, oppose a shearing resistance when a guidage phenomenon tends to occur. Given the arrangement of the plates and the large number thereof, the solution is particularly bulky in the direction of the pivoting axis. Furthermore, the essential presence of the lubricant requires that sealing elements be provided and incurs the risk of malfunction in case of leaks.

The aim of the present invention is to propose a stroller chassis with orientable wheels, whereof the control of the orientation of the wheels is improved simply and effectively relative to its comfort and safety.

To that end, the invention relates to a stroller chassis, in particular for transporting a child, as defined in claim 1.

The idea at the base of the invention is to prohibit hinging assemblies that can be completely reversibly blocked by control members requiring positive action from the user, in favor of two adjoining plates defining a planar sliding contact interface between them braked by friction. These plates produce an anti-guidage effect between the wheel and the frame of the stroller chassis: the aforementioned contact interface limits or even inhibits the transmission of pendular vibrations or oscillations around the pivoting axis between the wheel and the frame. In fact, the two plates of the engine assembly according to the invention are slidingly mounted against one another, which allows the user to pivot the wheel in relation to the frame of the chassis when he pushes that chassis along a curved path. However, the relative sliding of the plates is braked by contact friction between them. In this way, no sudden acceleration or deceleration of one of the plates relative to the other is allowed, which in particular avoids guidage of the wheel with respect to the frame. In other words, the plates of the hinge assembly according to the invention soften the pivoting of the wheel, thereby guaranteeing safety and comfort for the child transported by the stroller chassis.

In practice, it will be understood that the kinematic behavior between the plates can be more sliding than frictional, or vice versa, under the more or less softened effect that one wishes to apply to the pivoting of the wheel in relation to the frame. It is possible to play on this compromise between sliding and friction by choosing the materials making up the plates, at least as regards the portion thereof delimiting their adjoining planar surface, as well as the degree of roughness of the surfaces. In all cases, the plates according to the invention have the advantage of transmitting stresses between them distributed over a large contact interface, thereby limiting their wear, owing to their annular shape, outwardly surrounding the bearings guiding the free rotation between the frame and the wheel. In practice, it will be understood that the annular bodies of the plates do not have to be situated, along the pivoting axis, strictly at the same level as one of the bearings: it is only necessary, in projection in a plane perpendicular to the pivoting axis, for the majority or all of the annular bodies of the plates to be positioned radially outside the outer peripheral contour of the free rotation bearings. In this way, the anti-guidage effect produced at the contact interface between the plates is accentuated relative to the bearings, while advantageously providing that the hinge assembly remains compact in the direction of the pivoting axis. The transmission of the forces between the annular bodies of the plates is made effective and lasting under the effect of the resilient means pressing those bodies against one another. Furthermore, the arrangement with plates according to the invention is cost-effective.

Other advantageous features of the stroller chassis according to the invention, considered alone or according to all technically possible combinations, are specified independent claims 2 to 15.

The invention will be better understood upon reading the following description, provided solely as an example and done in reference to the drawings, in which.

Figure 1:
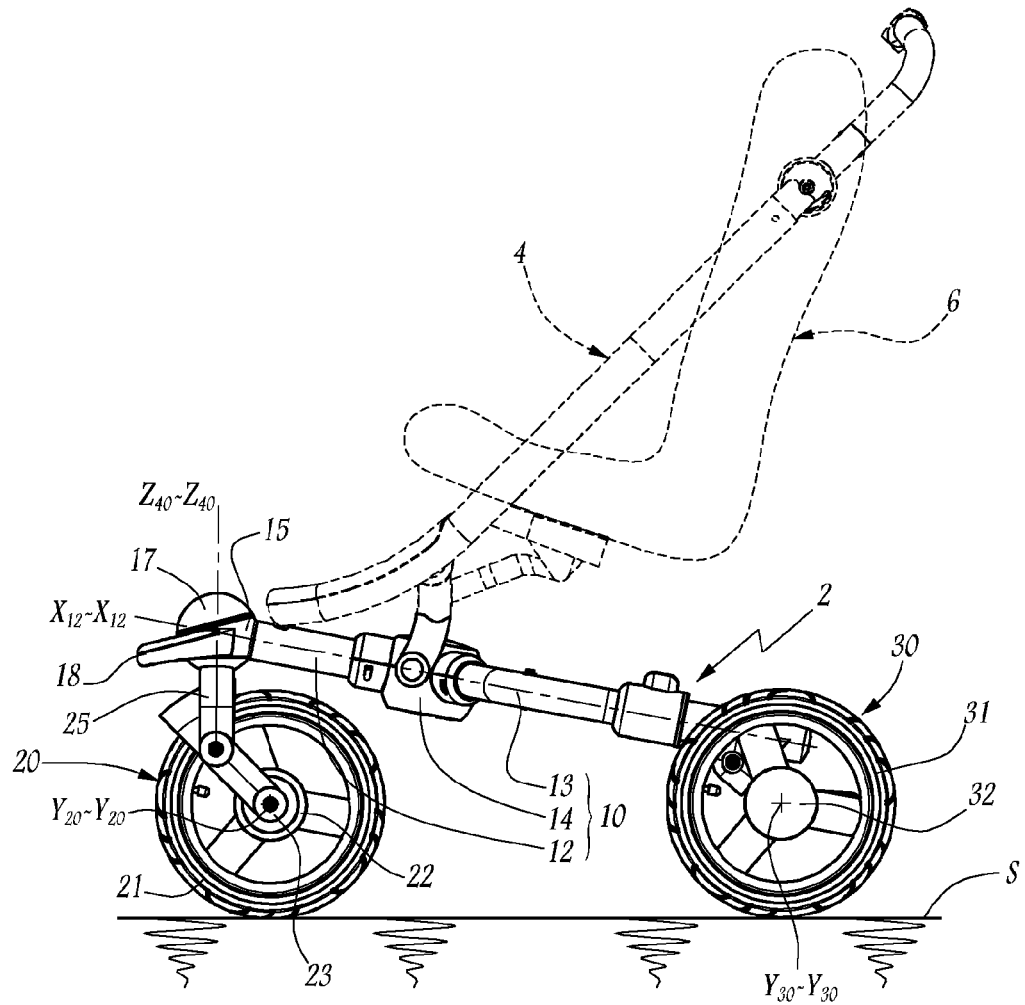
FIG. 1 is a diagrammatic side elevation view of the stroller chassis according to the invention.

FIG. 1 shows a chassis 2 of a stroller designed to transport a young child, while being pushed on the ground S by an adult. As shown very diagrammatically in FIG. 1, the stroller comprises, in addition to the chassis 2, a support 4 on which a seat 6 here is attached and fastened in which the transported child remains seated, having noted that, for clarity of the drawing, the child is not shown. In one alternative not shown, the seat 6 is replaced by a bed, making it possible to transport the child in an elongated position, or by another similar transport element not limiting on the present invention. In practice, the support 4 may have very diverse structures, which may or may not include components hinged to one another in relation to the others, with the understanding that each of these structures is advantageously supported by the chassis 2 in a hinged and/or removable manner, in particular for folding and/or storage of the stroller during periods in which it is not in use to transport the child.

Figure 2:
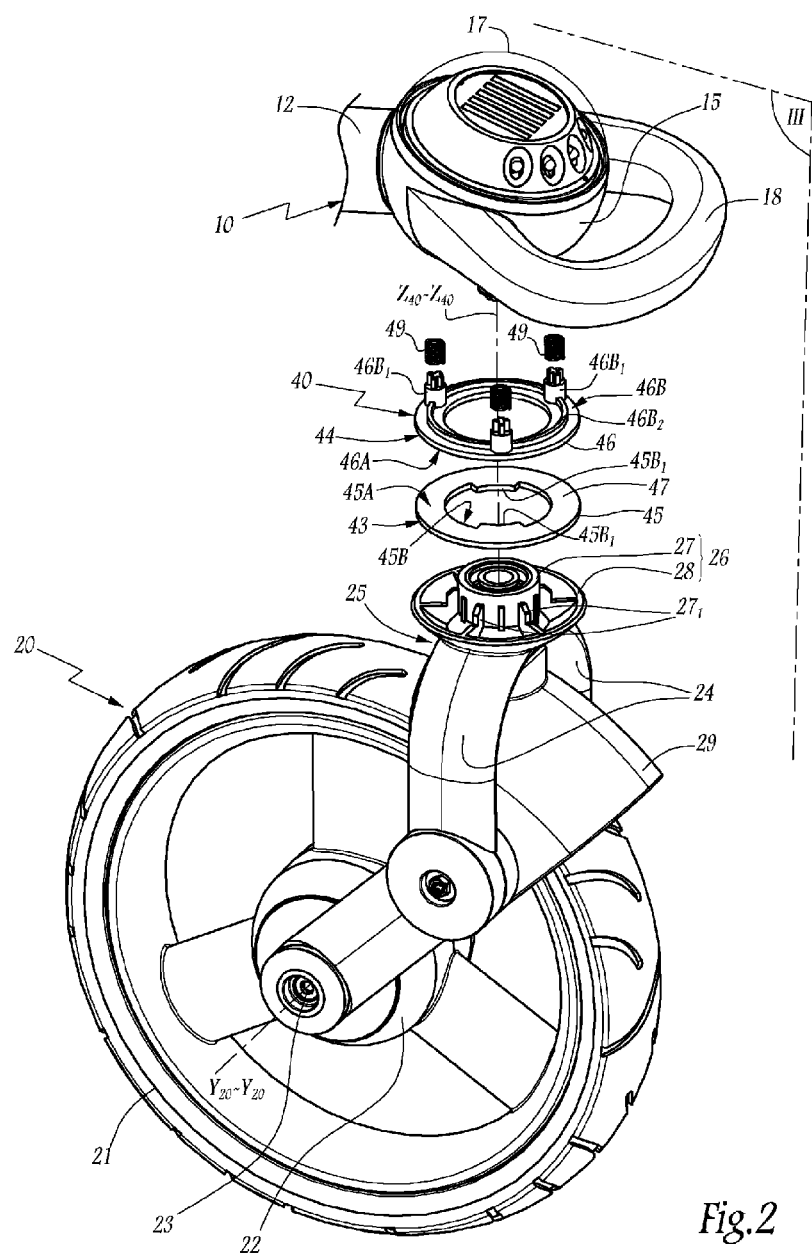
FIG. 2 is an exploded perspective view of a front portion of the stroller chassis of FIG. 1.
Figure 3:
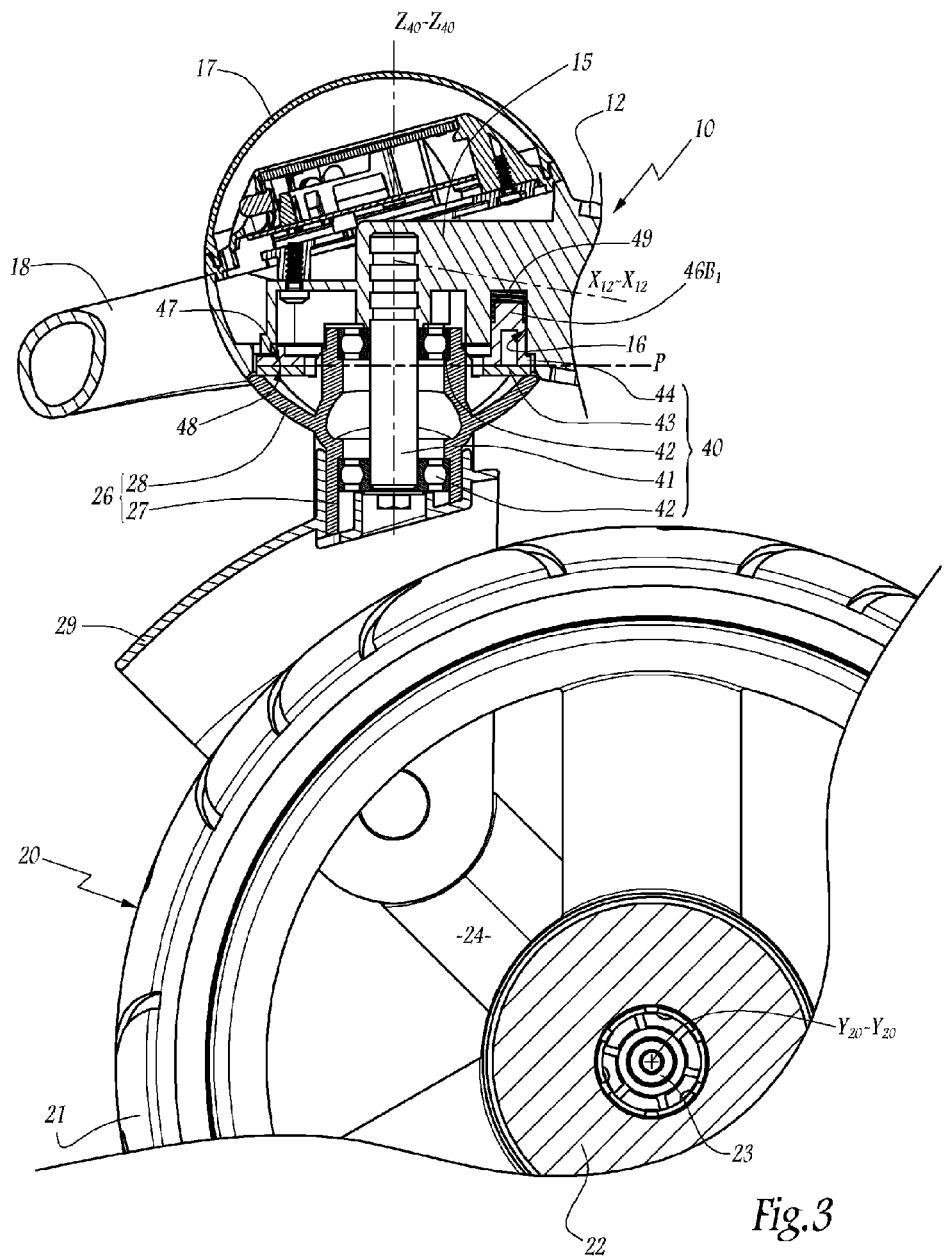
FIG. 3 is a cross-section in plane III of FIG. 2, showing the front portion of the stroller chassis in the assembled state.

For convenience, the rest of the description is oriented in relation to the stroller chassis 2 when the latter is in its in use configuration illustrated in FIG. 1, such that the terms "upper" and "top" refer to a direction oriented opposite the ground S and corresponding to the top part of FIGS. 1 to 3, while the terms "lower" and "bottom" designate an opposite direction. Likewise, the terms "front" and "back" are understood in relation to the normal direction of forward movement of the stroller, i.e. the direction in which that stroller is normally pushed, such that the front corresponds to the left portion of FIGS. 1 and 3.

The chassis 2 comprises a non-hinged rigid frame 10. In the embodiment considered in the figures, the frame 10 includes a single front arm 12 extending lengthwise in the anteroposterior direction of the chassis 2. The central longitudinal axis $X_{12}$-$X_{12}$ of this arm 12 advantageously belongs to an anteroposterior median vertical plane of the chassis 2. The frame 10 also includes a rear portion 13 rigidly connected to the front arm 12 by a central core 14 on which the support 4 is mounted. In a manner not shown in the figures, the rear portion 13 of the frame 10 is for example made up of two distinct arms, which generally extend in the anteroposterior direction of the chassis, while being substantially symmetrical to one another in relation to the anteroposterior median vertical plane of said chassis: for more detail on this aspect of the chassis 2, the reader may refer to WO-A-2009/092970.

To push the stroller on the ground A, the chassis 2 is provided with wheels bearing on the ground, i.e. a front wheel 20 and rear wheels 30, only one of which is visible in FIG. 1. These wheels 20 and 30 are provided rotating around themselves around respective rolling axes $Y_{20}$-$Y_{20}$, $Y_{30}$-$Y_{30}$ on the ground S. In practice, each of these wheels 20 and 30 can have various embodiments, both regarding its outer peripheral portion 21, 31 designed to roll on the ground, which may, for example, be made from rubber or an air chamber tire, and regarding its discoid central body 22, 32, which may be openworked or spoked, whereof the central geometric axis corresponds to the rolling axis $Y_{20}$-$Y_{20}$, $Y_{30}$-$Y_{30}$.

As clearly shown in FIGS. 2 and 3, the central body 22 of the front wheel 20 is rotatably mounted on a stationary hub 23 including the respective free ends of the branches 24 of the fork 25 connected to the arm 12 of the frame 10 by a mechanical hinge assembly 40. The fork 25 straddles an upper portion of the rolling portion 21 of the wheel 20, with its branches 24 extending, at least partially, radially to a rolling axis $Y_{20}$-$Y_{20}$. Opposite their free end, the branches 24 are rigidly connected by an upper end head 26 of the fork 25. This head 26 includes a central sleeve 27, from which a flange 28 extends outwardly running over the entire outer periphery of said sleeve and around which a mudguard 29 is attached.

The hinge assembly 40, which will be described below, is supported by a front end tip 15 fastened to the arm 12 of the frame 10. In practice, one embodiment consists of providing that this tip 15 is rigidly connected to the arm 12. According to another embodiment, which is more sophisticated and more related to that explained in detail in WO-A-2009/092970, this tip 15 consists of the front end of a shaft mounted coaxially to the inside of the arm 12: this shaft is stationary relative to the arm when the chassis 2 is in its in use configuration of FIG. 1 but, for the purpose of retracting the wheel 20, the aforementioned shaft may be rotated around the axis $X_{12}$-$X_{12}$. The reader may refer to the aforementioned document WO-A-2009/092970 for more details on this aspect, if necessary.

The hinge assembly 40 is designed to allow the wheel 20 to pivot in relation to the frame 10 around an axis $Z_{40}$-$Z_{40}$ that, without being secant with the rolling axis $Y_{20}$-$Y_{20}$ of the wheel, extends substantially perpendicular to the axis $Y_{20}$-$Y_{20}$. To that end, in the embodiment considered here, the hinge assembly 40 comprises a rod 41 rigidly connected to the tip 15, for example by forcible fitting or overmolding. The longitudinal central axis of said rod 40 defines the pivoting axis $Z_{40}$-$Z_{40}$. The hinge assembly 40 also comprises bearings 42, here ball bearings, inserted radially to the axis $Z_{40}$-$Z_{40}$ between the rod 41 and the sleeve 27 of the head 26 of the fork 25, said sleeve 27 in fact being arranged coaxially around the lower portion of the rod 41, as shown in FIG. 3. The bearings 42 thus support the head 26 of the fork 25, by guiding it freely in rotation around the rod 41 which, in use, is securely connected to the arm 12 by the tip 15.

According to the invention, the hinge assembly 40 also comprises two plates, i.e. a lower plate 43 and an upper plate 44. Each plate 43, 44 comprises an annular body 45, 46, which is centered on the axis $Z_{40}$-$Z_{40}$ and which is globally in the shape of a disk hollowed out in the central region thereof, as shown in FIG. 2.

On its side oriented toward the plate 44, the upper surface 45A of the body 45 of the plate 43 delimits a planar surface 47 which, in the embodiment considered here, advantageously occupies the entire aforementioned surface 45A. Furthermore, the inner periphery 45B of the annular body 45 is adapted to cooperate through complementary shapes with the head 26 of the fork 25 to rotatably connect the plate 43 and the wheel 20 around the pivoting axis $Z_{40}$-$Z_{40}$: more specifically, as shown in FIG. 2, this inner periphery 45B is provided with two raised portions $45B_1$ and $45B_2$ radially protruding toward the inside and diametrically opposite one another. Each of these raised portions $45B_1$ and $45B_2$ is sized to be received in an adjusted manner between ribs $27_1$ distributed along the outer periphery of the sleeve 27, so as to block the relative rotation of the plate 43 and the had 26 of the fork 25 around the axis $Z_{40}$-$Z_{40}$.

The plate 44 has, on its side oriented toward the plate 43, a lower surface 46A that delimits a planar surface 48 which, advantageously, occupies the entire aforementioned surface 46A. Furthermore, on its upper surface 46B, the body 46 is provided with three studs $46B_1$ axially protruding upwardly and distributed along the periphery of the body 46, connected to one another by a peripheral rib $46B_2$. As shown in FIG. 3, each stud $46B_1$ is received in a complementary cavity 16 delimited in the lower surface of the tip 15. In this way, the plate 44 is rotationally blocked around the axis $Z_{40}$-$Z_{40}$ in relation to the tip 15, which amounts to saying that said plate 44 is, in use, rotationally connected around the axis $Z_{40}$-$Z_{40}$ to the arm 12, through complementary shapes.

As shown in FIG. 3, the plates 43 and 44 are juxtaposed one above the other, so that their respective surfaces 47 and 48 are adjoining against one another in an adjoining plane referenced P in FIG. 3, which extends transversely, or, advantageously as here, perpendicular to the axis $Z_{40}$-$Z_{40}$. The planar contact between the plates 43 and 44 is done in a more pressing manner, under the action of the compression springs 49 respectively inserted, in the direction of the axis $Z_{40}$-$Z_{40}$, between the studs $46B_1$ and the bottom of the receiving cavities 16. In this way, under the action of these compression springs 49, the upper plate 44 is pressed against the lower plate 43, while thereby keeping the surface 48 pressed against the surface 47 in the direction of the axis $Z_{40}$-$Z_{40}$. Advantageously, each spring 49 is kept transversely inside the cavity 16, while being partially engaged around the upper end of the corresponding stud $45B_1$, sized accordingly.

When the wheel 20 pivots in relation to the frame 10 around the axis $Z_{40}$-$Z_{40}$, in both directions, the bearings 42 allow the free pivoting of that wheel whereas, at the same time, the cooperation of the plates 43 and 44 causes braking and, as a result, dynamic stabilization of the pivoting. More specifically, when the wheel 20 pivots in this way, its fork 25 pivots following the corresponding movement and rotates the lower plate 43 around the axis $Z_{40}$-$Z_{40}$ in relation to the upper plate 44: the surface 47 then slides against the surface 48, in the adjoining plane P, while being frictionally braked between the surfaces. In this way, any abrupt acceleration or deceleration of that pivoting, in particular related to vibrational, oscillating or pendular phenomena, is inhibited by friction between the surfaces 47 and 48, stressing, of course, that this friction does not block the pivoting, but only softens it. This dry contact effect, which is both sliding and frictional, between the plates 43 and 44 is even more significant in that, on the one hand, the springs 49 keep the annular bodies 45 and 46 pressing against one another and, on the other hand, the surfaces 44 and 48 extend all the way around the pivoting axis $Z_{40}$-$Z_{40}$, both over a significant radial expanse and at an adequate distance from the axis $Z_{40}$-$Z_{40}$, since the plates 43 and 44 are arranged outwardly around the sleeve 27. In other words, the extended contact interface between the annular bodies 45 and 46 of the plates 43 and 44 outwardly surrounds the bearings 42 and thereby inhibits the vibrational or pendular movements centered on the axis $Z_{40}$-$Z_{40}$, which may appear in those bearings, like guidage, during pivoting of the wheel 20 in relation to the frame 10.

In practice, the both sliding and frictional contact effect between the plates 43 and 44 is obtained in a satisfactory manner by providing that those plates are made, at least for the portion thereof delimiting the surfaces 47 and 48, from polyoxymethylene, such as Delrin (registered trademark). Alternatively, other materials can be used: in particular, only one of the two plates may be made from the plastic material, while the other is made from metal.

Furthermore, the anti-guidage effect obtained by the plates 43 and 44 advantageously makes it possible not to provide any other mechanism within the hinge assembly 40 mechanically blocking the pivoting of the wheel 20 in a predetermined fixed position, in particular in the position where its rolling axis $Y_{20}$-$Y_{20}$ extends perpendicular to the anteroposterior direction of the chassis 2. Furthermore, once the entire chassis 2 is tilted backward, with the front wheel 20 coming off the ground S, said front wheel is advantageously designed, under the gravitational pull of its own weight, to tend to align its body 22 in the anteroposterior median vertical plane of the chassis, which amounts to saying that its rolling axis $Y_{20}$-$Y_{20}$ then tends to extend perpendicular to the anteroposterior direction of the chassis. This propensity of the wheel 20 toward spontaneous alignment is accentuated by the fact that the pivoting axis $Z_{40}$-$Z_{40}$ does not extend strictly perpendicular to the axis $X_{12}$-$X_{12}$ of the arm 12, but is slightly inclined toward the rear, defining an acute angle with the aforementioned axis. It is stressed here that this feature of propensity toward alignment of the wheel 30 is not limiting on the invention, in that the plates 43 and 44 described thus far can of course be integrated into stroller frames whereof the associated wheel would be too light and/or have too small a diameter not to produce this advantageous effect.

As one advantageous optional arrangement, the tip 15 is fixedly topped by a semi-spherical trim 17 covering the hinge assembly 40. On its opposite side in the direction of the axis $Z_{40}$-$Z_{40}$, the tip 15 is covered by the flange 28, which thus forms a trim opposite the trim 17: subject to suitable respective configurations of the side surface of the tip 16 and of the flange 28, said tip and said flange define, jointly with the trim 17, a spherical outer enclosure inside which is housed, for the most part, the hinge assembly 40, in particular inside which are housed all of the plates 43 and 44 as well as the compression springs 49. This spherical outer enclosure produces a "visual signature" effect, specific to the stroller 2, the plates 43 and 44 being arranged and sized while best occupying the lower portion of that enclosure.

Advantageously, in order to have a lighted warning lamp, a light source as well as a photovoltaic cell for the electrical power of that source are arranged inside the aforementioned spherical enclosure. Detailed terms for producing such a warning lamp are provided in WO-A-2006/111656, to which the reader may refer.

Likewise, as an advantageous optional arrangement, the tip 15 is extended, toward the front, by handle 18 rigidly connected to that tip, while for example being directly secured to the tip. Said handle 18 here assumes the form of a hoop that extends along the front end portion of the tip and along a direction globally peripheral to that tip, while forming a space between them sufficient for the user to be able to insert the fingers of one hand therein so as to grasp the handle. The interest of the handle 18 is outlined in WO-A-2009/092970, to which the reader may refer.

Various arrangements and alternatives of the stroller chassis 2 described thus far can also be considered. The reader may in particular refer to the aforementioned documents WO-A-2006/111656 and WO-A-2009/092970, as well as document WO-A-2008/099095. In particular, as examples:

as already mentioned above, it is stressed that the arrangement with plates 43 and 44 can be integrated both in the hinging mechanism of a retractable wheel and in the hinging mechanism of a non-retractable wheel with regard to the frame of the chassis;

rather than acting on the plate 44 to press it against the plate 43, the springs 49 can be inserted between the wheel 20 and the plate 43 so as to press the latter against the plate 44; more generally, the rod 41 and sleeve 27 structure can be reversed between the frame 10 and the wheel 20, inasmuch as the bearings 42 radially inserted between them are outwardly surrounded by the plates 43 and 44;

rather than having the plates 43 and 44 be made in the form of two separate parts, attached to the stroller chassis as described in light of the figures, one of them may, in an alternative that is not shown, be directly secured, in particular molded, with either the fork 25 or the tip 15, while the other plate, which is then rotatably connected around the axis $Z_{40}$-$Z_{40}$ to the tip or the fork, respectively, would be pressed against the plate secured under the action of resilient means functionally similar to the compression springs 49;

rather than providing several small springs 49 distributed along the periphery of the annular bodies 45 and 46 of the plates 43 and 44, one alternative consists of providing only a single compression spring, which is arranged in a centered manner on the pivoting axis $Z_{40}$-$Z_{40}$ and whereof the end turn, turned toward the plates, bears on one of the annular bodies of the plates, running along the entire perimeter of that body;

the invention is not limited to stroller chassises having a single front wheel; in particular, the invention applies to chassises equipped with two front wheels situated on either side of and at a distance from the anteroposterior median vertical plane of that chassis;

the front wheel 20 or each of the front wheels mentioned just above can be replaced by a pair of twinned wheels, or a set of twinned wheels;

the shape of the elongate piece connecting the stationary hub 23 of the wheel 20 to the engine assembly 40 is not limited to a fork, such as the fork 25; in particular, said fork 25 may be replaced by a single arm; and/or unlike the embodiment shown in the figures, the pivoting axis $Z_{40}$-$Z_{40}$ between the wheel 20 and the frame 10 can intersect the rolling axis $Y_{20}$-$Y_{20}$ of the wheel.

The invention claimed is:

1. A stroller chassis comprising:
a frame and at least one wheel resting on the ground, which are connected to each other by a mechanical hinge assembly defining a pivoting axis, which extends perpendicularly to the wheel rolling axis on the ground and around which the frame and the wheel pivot with respect to one another,
at least one bearing for guiding the frame and the wheel in free rotation around said pivoting axis with respect to each other,
two plates, each including an annular body, which is centered substantially with respect to the pivoting axis and which is arranged externally around the at least one bearing, said two annular bodies being connected rotatably around the pivoting axis to the frame and to the wheel respectively, and defining respective substantially planar surfaces on one of the axial end surfaces thereof, said planar surfaces being mutually adjoining along an adjoining plane, which is transverse to the pivoting axis, and cooperating with one another by means of sliding and frictional contact, and
resilient means for pressing the respective annular bodies of the plates against each other and thus maintaining the planar surfaces applied against each other in the direction of the pivoting axis.

2. The stroller chassis according to claim 1, wherein the planar surfaces cooperate with each other by dry contact.

3. The stroller chassis according to claim 1, wherein the plates are two separate pieces, respectively connected to the wheel and to the frame.

4. The stroller chassis according to claim 1, wherein one of the two plates is integral with a piece either of the wheel or of the frame, the other plate then being attached to the frame or to the wheel, respectively.

5. The stroller chassis according to claim 1, wherein each planar surface extends all around the pivoting axis.

6. The stroller chassis according to claim 1, wherein the at least one bearing is inserted, radially to the pivoting axis, between a central rod and a sleeve that are both centered on the pivoting axis and that are respectively and indifferently fastened to the frame and to the wheel, and in that the respective annular bodies of the plates are arranged outwardly around the sleeve.

7. The stroller chassis according to claim 1, wherein the respective annular bodies of the plates are respectively rotatably connected to the frame and to the wheel through complementary shapes.

8. The stroller chassis according to claim 6, wherein the sleeve is provided with at least one outer raised portion adapted to cooperate with an adjusted raised portion of the inner periphery of one of the two annular bodies so as to rotatably connect the sleeve and the corresponding plate.

9. The stroller chassis according to claim 6, wherein the central rod is secured to a tip in which cavities are defined for receiving complementary studs that extend protruding from the axial end surface of one of the two annular bodies, opposite its planar surface, so as to rotatably connect the rod and the corresponding plate.

10. The stroller chassis according to claim 1, wherein the resilient means include at least one compression spring inserted, along the direction of the pivoting axis, either between the frame and the annular body of the plate, rotatably connected to the frame, or between the wheel and the annular body of the plate, rotatably connected to the wheel.

11. The stroller chassis according to claim 9, wherein the resilient means include several compression springs inserted, along the direction of the pivoting axis, either between the frame and the annular body of the plate, rotatably connected to the frame, or between the wheel and the annular body of the plate, rotatably connected to the wheel, each of compression springs being transversely maintained inside one of the cavities defined in the tip.

12. The stroller chassis according to claim 10, wherein the resilient means include a single compression spring, which is substantially centered on the pivoting axis and whereof the end turn, turned toward the plates, runs along the perimeter of the annular body of one of the plates.

13. The stroller chassis according to claim 1, wherein each plate is made, at least for the portion of its annular body defining the corresponding planar surface, from polyoxymethylene.

14. The stroller chassis according to claim 1, wherein the hinge assembly is supported by a tip secured to an end portion of the frame and rotatably connected to the corresponding plate, the hinge assembly being at least partially covered, on either side, along the pivoting axis, of that tip, by a first trim secured to the tip and by a second trim secured to a stationary hub of the wheel, these first and second trims defining, jointly with the tip, a substantially spherical outer enclosure inside which all of the plates and the resilient means are housed.

15. The stroller chassis according to claim 1, wherein the wheel is provided with an elongate piece that connects a stationary hub of that wheel and the hinge assembly, and whereof one end is both rotatably connected to the corresponding plate and supported by at least one bearing that is mounted around a rod belonging to the hinge assembly, which is secured to the frame and centered on the pivoting axis.

* * * * *